United States Patent
Tada et al.

(10) Patent No.: US 8,621,311 B2
(45) Date of Patent: Dec. 31, 2013

(54) DATA TRANSFER DEVICE, METHOD, AND PROGRAM

(75) Inventors: Atsuko Tada, Kawasaki (JP); Ryuta Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 13/158,132

(22) Filed: Jun. 10, 2011

(65) Prior Publication Data

US 2011/0314351 A1 Dec. 22, 2011

(30) Foreign Application Priority Data

Jun. 18, 2010 (JP) .................................. 2010-139558

(51) Int. Cl.
 *H04L 1/18* (2006.01)
 *H03M 13/00* (2006.01)

(52) U.S. Cl.
 USPC ............................ 714/749; 714/751; 714/752

(58) Field of Classification Search
 None
 See application file for complete search history.

(56) References Cited

U.S. PATENT DOCUMENTS

| | | | |
|---|---|---|---|
| 6,977,888 B1* | 12/2005 | Frenger et al. | 370/218 |
| 7,412,005 B2* | 8/2008 | Wang et al. | 375/260 |
| 7,496,335 B2* | 2/2009 | Nibe | 455/115.1 |
| 7,630,320 B2* | 12/2009 | Zhang et al. | 370/252 |
| 7,949,924 B2* | 5/2011 | Kim et al. | 714/751 |
| 8,281,200 B2* | 10/2012 | Han et al. | 714/748 |
| 8,312,337 B2* | 11/2012 | Park et al. | 714/748 |
| 8,347,189 B2* | 1/2013 | Ihara | 714/776 |
| 2006/0018259 A1* | 1/2006 | Kadous | 370/236 |
| 2007/0149149 A1* | 6/2007 | Nibe | 455/115.1 |
| 2007/0171855 A1* | 7/2007 | Yoneta | 370/328 |
| 2008/0002617 A1* | 1/2008 | Peisa et al. | 370/329 |
| 2008/0065944 A1* | 3/2008 | Seol et al. | 714/748 |
| 2009/0276678 A1* | 11/2009 | Ihara | 714/751 |

FOREIGN PATENT DOCUMENTS

JP 2005-12753 1/2005

* cited by examiner

*Primary Examiner* — Daniel McMahon
(74) *Attorney, Agent, or Firm* — Fujitsu Patent Center (57) ABSTRACT

A data transfer device, including a packet receiving unit to receive packets in a block including a data packet and an error-correction packet; a packet-loss detection unit to detect a packet loss from a head of a block received by the packet receiving unit of a received packet; a packet transfer unit to transfer the packet received from the packet receiving unit with a delay of a predetermined time; and a retransmission-request transmission unit to transmit a retransmission request to a packet-transmission source device based on the packet loss detected by the packet-loss detection unit and a determined retransmission time to retransmit the packet.

4 Claims, 8 Drawing Sheets

DATA TRANSFER DEVICE, METHOD, AND PROGRAM

CROSS-REFERENCE TO RELATED APPLICATIONS

This application is based upon and claims the benefit of priority of the prior Japanese Patent Application No. 2010-139558, filed on Jun. 18, 2010, the entire contents of which are incorporated herein by reference.

FIELD

The embodiments discussed herein are related to a data transfer device, a data transfer method, and a data transfer program.

BACKGROUND

Forward Error Correction (FEC) is known as an example of an error-correcting method for recovering lost packets in the Internet Protocol (IP) network.

The FEC is a technology in which data is recovered from redundant data that is added to data during transmission on the receiving side.

For example, prevention of an increase in errors in the downstream device has been desired when a relay transmission is conducted for sequentially transferring data from an upstream-side device to a downstream-side device at a certain bit rate. In other words, the downstream-side device accumulates data errors, which occurred before, when the data is transferred from the upstream-side device to the downstream-side device without correcting packet loss in the upstream-side device. For this reason, the upstream-side device adds a FEC packet to the data every two or more packets and then transmits the data to the downstream-side device. The upstream-side device further transmits data while the downstream-side device corrects the data using the FEC packet in the downstream device. Therefore, the accumulation of errors in the downstream-side device may be prevented.

As a technology for performing data transfer using the FEC, a proposed technology is to suppress a variation in transfer rate by transferring data with a delay of a predetermined value (T−K·τ) when performing a relay transmission while correcting packet loss, so-called errors, by the FEC. Here, "τ" represents transfer interval of packets. Also, "K" represents the number of lost packets. In addition, "T" is a fixed value which is larger than "M·τ" obtained by multiplying the number of packets restorable with a FEC packet "F" by the transfer interval "τ" of packets. As an example, the case where "M·τ+α" is adopted is assumed. Here, "α" represents a transfer delay time which indicates the time delayed by transmission. As an example, "α" is provided with a positive value near zero.

Figure 7:
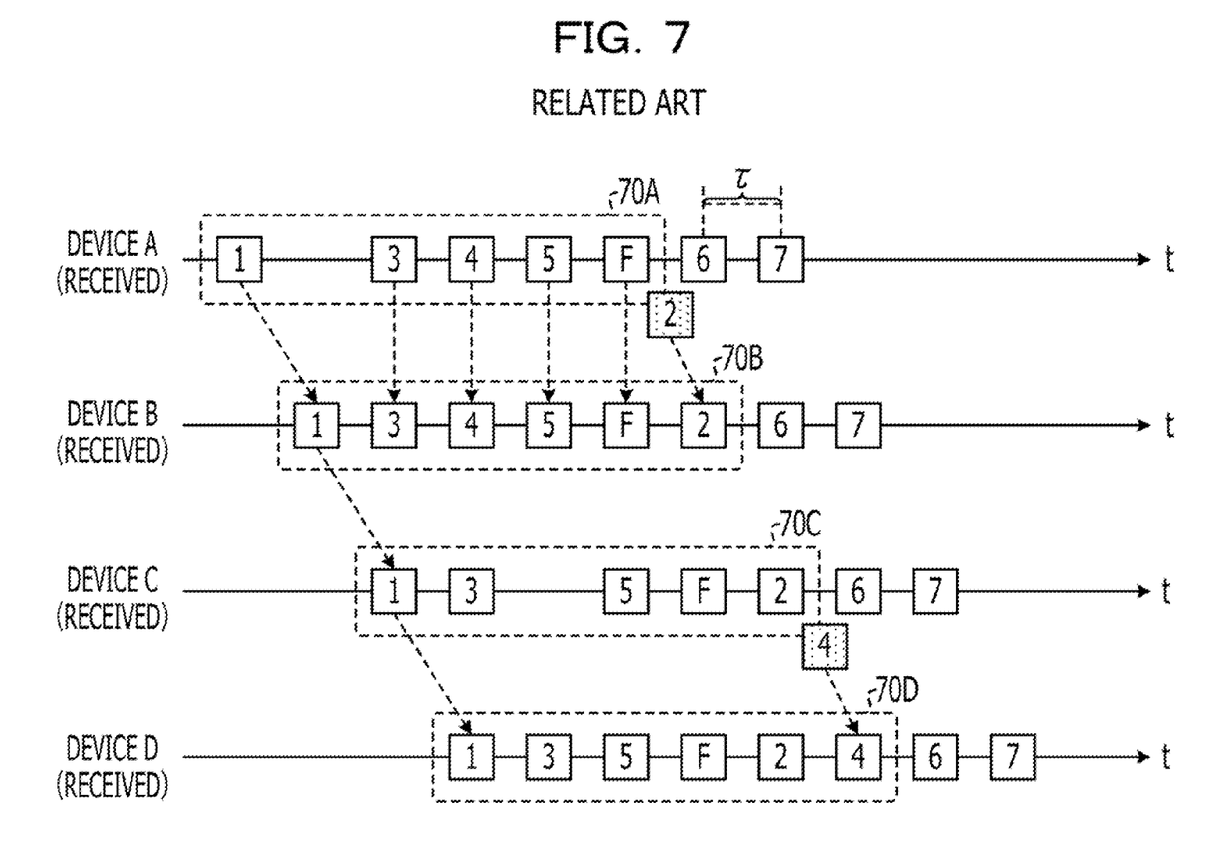
FIG. 7 is a diagram illustrating exemplary data transfer according to the related art.

FIG. 7 is a diagram illustrating an exemplary data transfer of the related art. The example illustrated in FIG. 7 considers that the number of packets is six in one block and data transfer is sequentially performed on devices A, B, C, and D in this order. Reference numerals 1 to 7 in FIG. 7 represent data packets where data to be transferred is allocated. In addition, reference numerals 70A to 70D in FIG. 7 represent blocks each containing six packets including five packets (data packets 1 to 5) and a FEC packet F. In the example illustrated in FIG. 7, the transfer interval of packets is defined "τ" and the transfer delay of packets is defined "T−K·τ", and the number of packets M restorable by a FEC packet F is set to "1". Then, data transfer is considered to be performed under the condition of: T=M·τ+α.

As illustrated in FIG. 7, the device A receives a data packet 1. In this case, the number of lost packets becomes zero (K=0). Thus, the device A transmits the data packet 1 to the device B with a delay of τ+α (=1·τ+α−0·τ). Then, the device A skips the data packet 2 and receives the data packet 3. In this case, since the data packet 2 has been lost, the number of lost packets becomes one (K=1). Thus, the device A transmits the data packet 3 to the device B with a delay of τ+α (=1·τ+α−1·τ). Similarly, the device A transfers the data packet 4, the data packet 5, and the FEC packet F to the device B with a delay of α. Then, the device A employs the FEC packet F to restore the missing data packet 2 among the packets in the block 70A and then transmits the restored data packet 2 to the device B.

Furthermore, the device B normally receives each of the packets in the block 70B in the order of the data packet 1, the data packet 3, the data packet 4, the data packet 5, the FEC packet F, and the data packet 2. Thus, the device B transmits each packet to the device C with a delay of "τ+α". In the device C, among packets in the block 70C, all the packets except the data packet 4 are normally received. That is, the device C only lacks the data packet 4 which is the third one transmitted from the device B. Thus, the device C restores the data packet 4 with the FEC packet F after transmitting the normally received packets to the device D and then transmits the data packet 4 to the device D. In addition, the device D normally receives the data packet 1, the data packet 3, the data packet 5, the FEC packet F, the data packet 2, and the data packet 4 in the block 70D in this order.

The data transfer causes a delay of some packets in the block transferred from one device to another device, compared with other packets. In addition, the data transfer is prevented from causing a variation in the transfer rate in which the interval of packet receiving is too narrow.

The technology described above is disclosed in Japanese Laid-open Patent Publication No. 2005-12753 (filed on Jan. 13, 2005).

SUMMARY

A data transfer device, including: a packet receiving unit to receive packets in a block including a data packet and an error-correction packet; a packet-loss detection unit to detect a packet loss from a head of a block received by the packet receiving unit of a received packet; a packet transfer unit to transfer the packet received from the packet receiving unit with a delay of a predetermined time; and a retransmission-request transmission unit to transmit a retransmission request to a packet-transmission source device based on the packet loss detected by the packet-loss detection unit and a determined retransmission time to retransmit the packet.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of a data transfer apparatus, a data transfer method, and a data transfer program, which are disclosed in the present application, will be described in detail with reference to the attached drawings. Here, these embodiments do not restrict the disclosed technologies. First, the problems of the related art will be described before describing the embodiments of the present application.

In the above related art, a specified value, $T-K\cdot\tau$, which delays packet transfer when the number of lost packets exceeds the ability of error correction, becomes a negative value. Thus, there is a disadvantage in that a variation in transfer rate occurs because the transfer itself is not established by the expression "$T-K\cdot\tau$", In addition, there is another disadvantage in that, when desired data is acquired by performing a retransmission request to the upstream device and then transferred to the downstream device, the longer the time required for packet retransfer becomes, the more the transfer delay increases. Thus, a variation in transfer rate also occurs.

Figure 8:
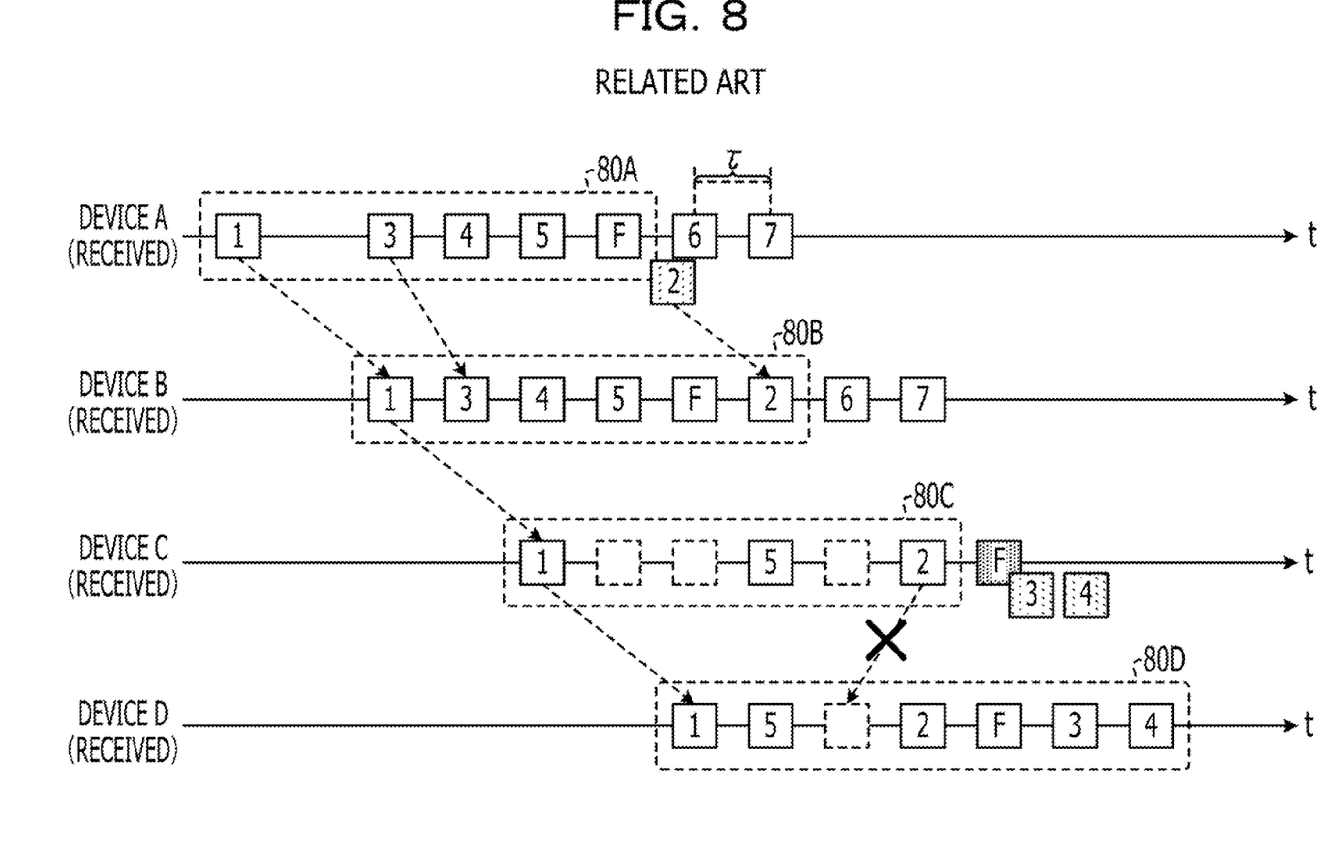
FIG. 8 is a diagram illustrating exemplary data transfer according to the related art.

This disadvantage will be described with reference to FIG. 8. FIG. 8 is a diagram illustrating an exemplary data transfer of the related art. The example illustrated in FIG. 8 considers that the number of packets is six in one block and data transfer is sequentially performed on devices A, B, C, and D in this order. Reference numerals 1 to 7 in FIG. 8 represent data packets where data to be transferred is allocated. In addition, reference numerals 80A to 80D in FIG. 8 represent blocks each including six packets including five packets (data packets 1 to 5) and a FEC packet F. In the example illustrated in FIG. 8, the transfer interval of packets is defined "$\tau$" and the transfer delay of packets is defined "$T-K\cdot\tau$", and the number of packets M, which is restorable by the FEC packet F is set to "2". Then, data transfer is considered to be performed under the condition of: $T=M\cdot\tau+\alpha$.

In the example illustrated in FIG. 8, a variation in transfer rate occurs when the device C transmits the received packet to the device D. In other words, as illustrated in FIG. 8, the device C receives data packet 1. In this case, the number of lost packets becomes zero (K=0).

Thus, the device C transmits the data packet 1 to the device D with a delay of $\tau+\alpha$ ($=2\cdot\tau+\alpha-0\cdot\tau$). Subsequently, the device C skips the data packets 3 and 4 and receives the data packet 5. In this case, the data packets 3 and 4 are lost, and the number of lost packets is two (K=2). Thus, the device C transmits the data packet 5 to the device D with a delay of $\alpha$ ($=2\cdot\tau+\alpha-2\cdot\tau$).

Furthermore, the device C skips the FEC packet F and receives the data packet 2. In this case, the FEC packet is lost in addition to the loss of the data packets 3 and 4. Thus, the number of lost packets is three (K=3). However, if the lost packet number K=3 exceeds the packet number M=2, which allows the FEC packet F to be restored, $T-K\cdot\tau$ ($=2\cdot\tau+\alpha-3\cdot\tau$) becomes a negative value. Therefore, the transfer interval of packets varies such that a time of $2\tau$ elapses from the arrival of the data packet 5 on the device D to the arrival of the data packet 2 on the device D even if the device C transmits the received data packet 2 to the device D with the minimum delay $\alpha$. Therefore, the device C causes a variation in transfer rate to the block 80D due to a prolonged time of transmitting from the block 80C. In addition, when the device C makes the device B retransmit the FEC packet F among the lost packets to the device C and then transmits the FEC packet F to the device D, the more the time is required for retransmitting from the device B to the device C, the larger the transfer delay of each of the FEC packet F, the data packet 3, and the data packet 4.

[Embodiment 1]

Figure 1:
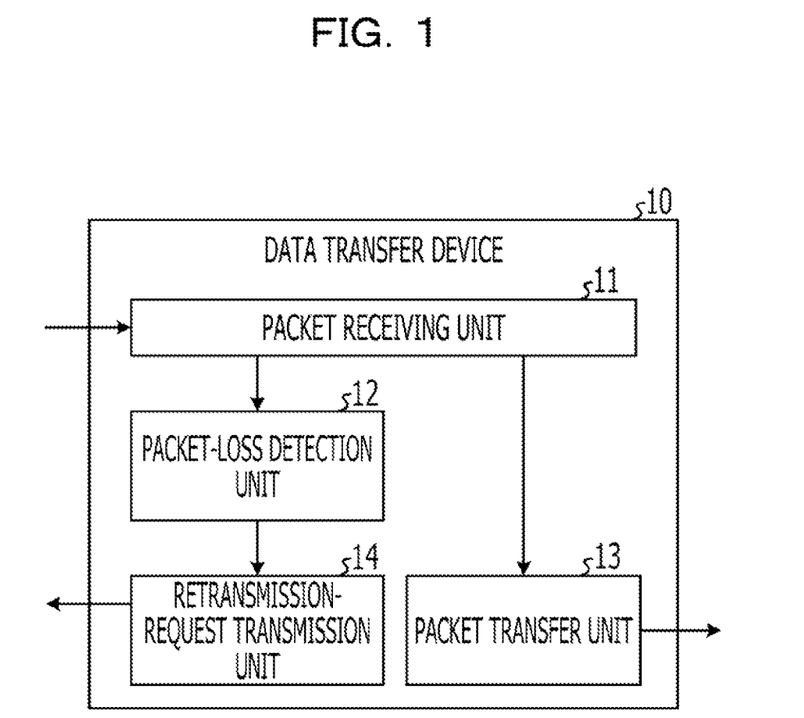
FIG. 1 is a block diagram illustrating the configuration of a data transfer apparatus according to a first embodiment.

FIG. 1 is a block diagram illustrating the configuration of a data transfer apparatus according to a first embodiment. A data transfer apparatus 10 illustrated in FIG. 1 includes a packet receiving unit 11, a packet-loss detection unit 12, a packet transfer unit 13, and a retransmission-request transmission unit 14.

The packet receiving unit 11 receives packets constituting a block in which data packets and error correction packets are included. The packet-loss detection unit 12 detects a packet loss from the first to currently received packets of a block received by the packet receiving unit 11. In addition, the packet transfer unit 13 transfers a packet received from the packet receiving unit 11 with a delay of a predetermined time. Furthermore, the retransmission-request transmission unit 14 transmits a retransmission request to the packet-transmission source device based on the packet loss detected by the packet-loss detection unit 12 and a necessary retransmission time which is required for retransmitting a packet.

Thus, the data transfer device 10 of the present embodiment brings forward a retransmission request which takes into account not only the number of packets which are error-correctable by error correction packets, but also a necessary retransmission time which is required for retransmitting a packet. Therefore, the data transfer device 10 of the present embodiment is capable of reducing the possibility of requiring the retransmitting of a packet when receiving the last stage packets of a block. Thus, even if a packet loss has already occurred when the final stage packets of the block are transferred, the data transfer device 10 of the present invention may become increasingly likely to restore the packet loss by itself using the error correction packet. Thus, the data transfer device 10 of the present embodiment may be prevented from causing a variation in transfer rate.

[Second Embodiment]

[System Configuration]

Figure 2:
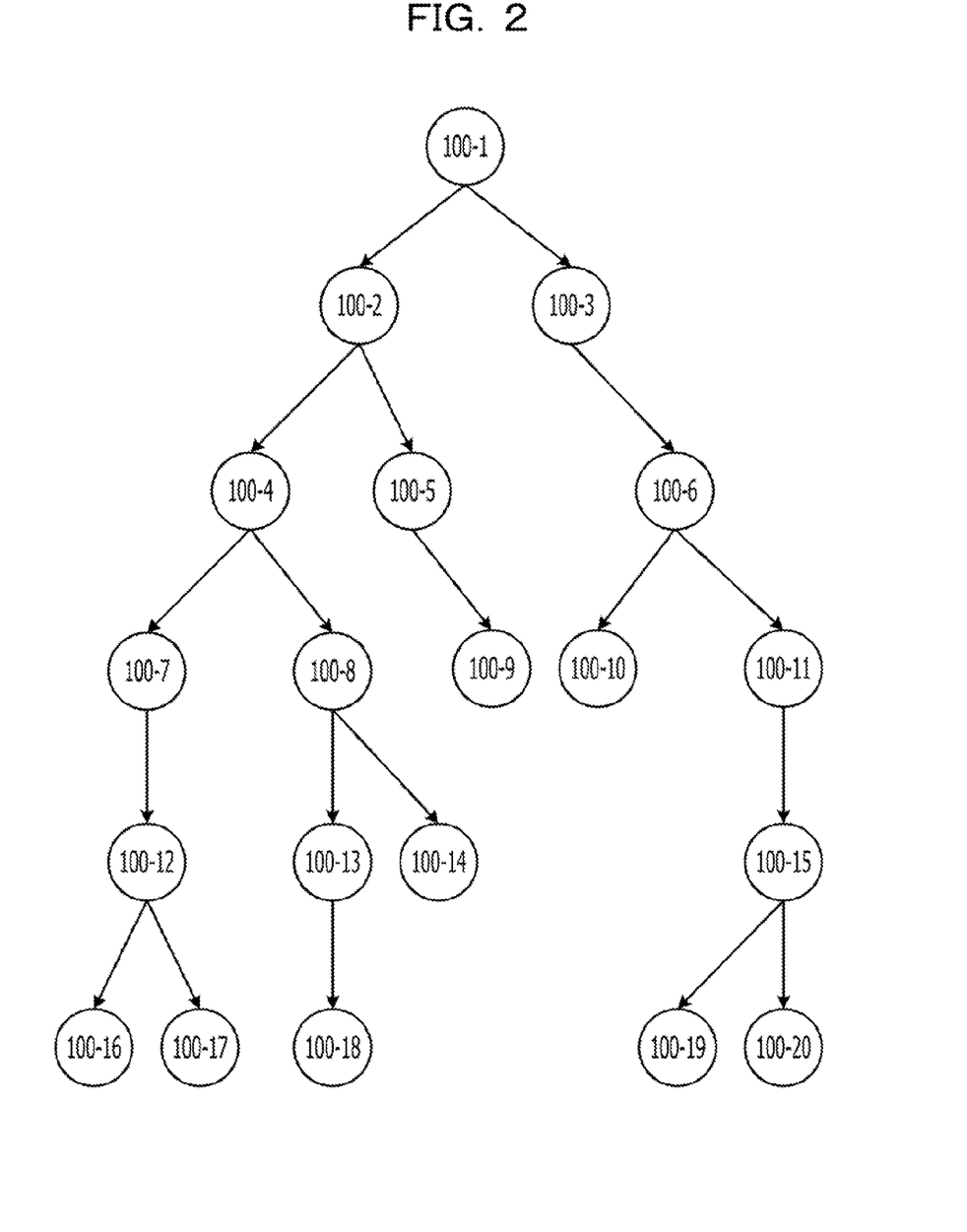
FIG. 2 is a diagram illustrating exemplary relay transfer performed in a data transfer system according to a second embodiment.

Next, a data transfer system according to a second embodiment will be described. FIG. 2 is a diagram illustrating an exemplary relay transmission performed by a data transfer system according to a second embodiment. The example illustrated in FIG. 2 considers a case where various contents of video data and audio data are relay-transferred to the data transfer devices 100-1 to 100-20.

The example illustrated in FIG. 2 considers a case where Peer to Peer (P2P), Application Layer Multicast (ALM), or the like is employed as a communication system for communication between data transfer devices from a viewpoint of substantially preventing loads from concentrating on a specific communication node. Furthermore, the communication system of the data transfer device to be employed may be any communication system, for example, so that a common client server system other than P2P and ALM may be also applicable to the disclosed device.

The data transfer system illustrated in FIG. 2 performs relay transmission at a certain bit rate to sequentially transfer data from the data transfer device 100-1 located at the highest level of a tree to the downstream data transfer devices.

As illustrated in FIG. 2, data distributed by the data transfer device 100-1 is relay-transferred to data transfer devices 100-16 and 100-17 via data transfer devices 100-2, 100-4, 100-7, and 100-12. In addition, data distributed by the data transfer device 100-1 is relay-transferred to data transfer device 100-18 via data transfer devices 100-2, 100-4, 100-8, and 100-13. Furthermore, data distributed by the data transfer device 100-1 is relay-transferred to a data transfer device 100-14 via data transfer devices 100-2, 100-4, and 100-8. In addition, data distributed by the data transfer device 100-1 is relay-transferred to a data transfer device 100-9 via data transfer devices 100-2 and 100-5. Furthermore, data distributed by the data transfer device 100-1 is relay-transferred to a data-transfer device 100-10 via data transfer devices 100-3 and 100-6. Furthermore, data distributed by the data transfer device 100-1 is relay-transferred to data-transfer devices 100-19 and 100-20 via data transfer devices 100-3, 100-6, 100-11, and 100-15.

The data transfer devices 100-1 to 100-20 may be information processing devices having communication functions. As an example, the data transfer devices 100-1 to 100-20 may be fixed terminals, such as a personal computer or a server, or mobile terminals, such as a cell phone, a personal handy phone system (PHS), or a personal digital assistance (PDA). Other examples may include a Layer 3 switch (L3 switch), a router, and a network device such as a computer provided with a router function. Hereinafter, the data transfer devices 100-1 to 100-20 will be collectively called a data transfer device 100.

A data transfer device 100 illustrated in FIG. 2 transfers data from the device 100 itself to another device on the downstream side thereof after adding a Forward Error Correction (FEC) packet to the data. As long as the number of lost packets K is not more than the number of recoverable packets M by the FEC packet F, the FEC packet allows the downstream data transfer device 100 to avoid retransferring packets to the upstream data transfer device 100.

[Configuration of Data Transfer Device]

Figure 3:
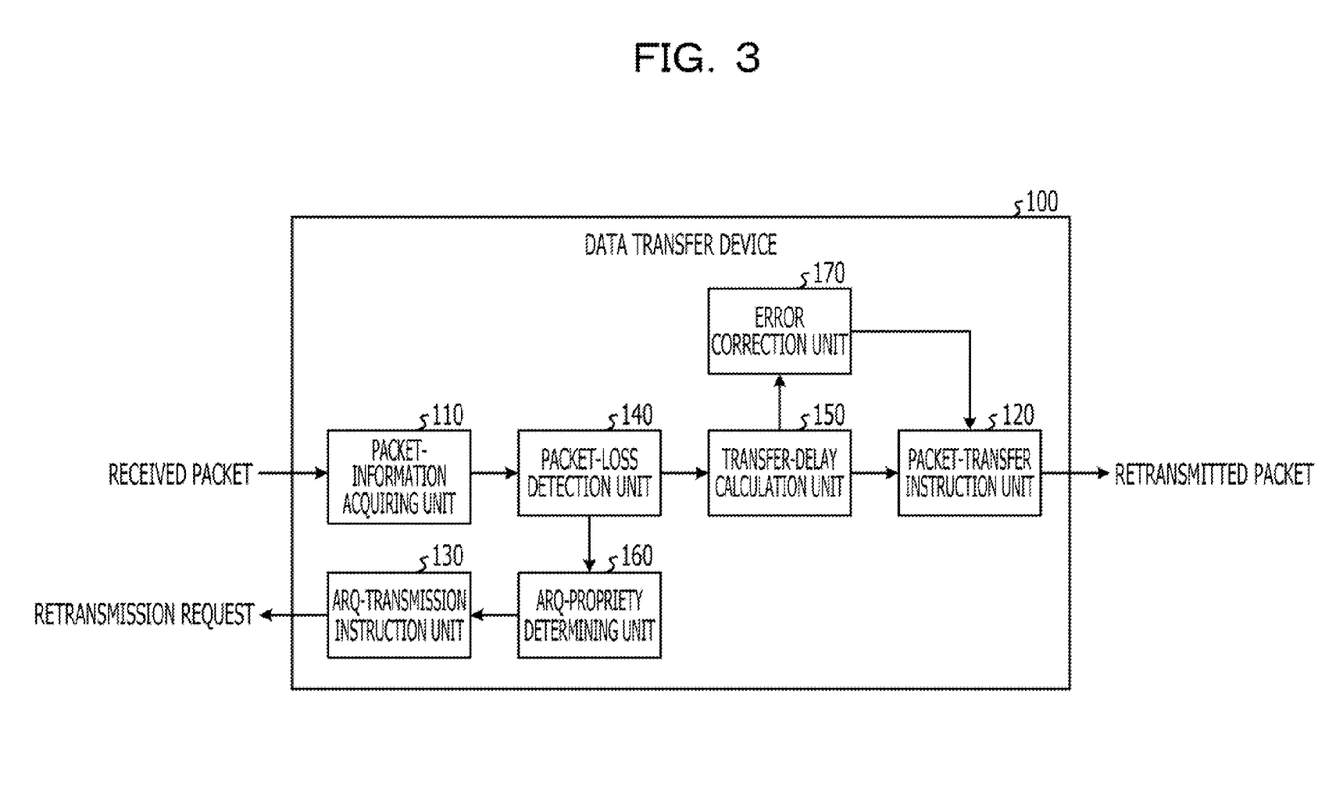
FIG. 3 is a block diagram illustrating a data transfer apparatus according to the second embodiment.

Next, the configuration of the data transfer device 100 of the present embodiment will be described. FIG. 3 is a block diagram illustrating the configuration of the data transfer device of the second embodiment. Here, in addition to functional units illustrated in FIG. 3, the data transfer device 100 also has further functions of various functional units, such as various input devices and display devices, which may be found in a known computer.

The data transfer device 100 illustrated in FIG. 3 includes a packet-information acquiring unit 110, a packet-transfer instruction unit 120, an Automatic repeat-request (ARQ) transmission instruction unit 130, a packet-loss detection unit 140, a transfer-delay calculation unit 150, an ARQ-propriety determining unit 160, and an error correction unit 170.

Among these units, the packet-information acquiring unit 110, the ARQ-transmission instruction unit 130, and the packet-transfer instruction unit 120 are connected to a communication interface (not shown) in the data transfer device 100. The packet-information acquiring unit 110, ARQ-transmission instruction unit 130, and packet-transfer instruction unit 120 communicate with external devices including other data transfer devices via the communication interface.

When a packet from the upstream data transfer device is received, the packet-information acquiring unit 110 serves as a processing unit that determines information about the FEC block where the received packet belongs.

For example, the packet-information acquiring unit 110 acquires the information about the FEC block including the received packet. As an example, the packet-information acquiring unit 110 acquires a packet type from a FEC header in the received packet, which determines whether the received packet is a data packet or a FEC packet. As another example, the packet-information acquiring unit 110 acquires a sequence number in the FEC block, which is given to the received packet among sequence numbers given to the respective packets in the FEC blocks. The sequence numbers in the FEC block are sequence numbers given to the respective packets in order of transmission when the packets are transmitted from the upstream data transfer device.

In addition, the packet-information acquiring unit 110 acquires information about the received packet itself.

For example, the packet-information acquiring unit 110 acquires information about whether the received packet is a new packet or a retransmitted packet by referring to the header, for example a RTP header, of the received packet. The packet-information acquiring unit 110 also acquires the sequence numbers given to the received packets.

The new packet refers to the packet which is newly received from the upstream data transfer device. The retransferred packet refers to the packet retransmitted from the upstream data transfer device.

The packet-transfer instruction unit 120 is a processing unit which transmits a packet received from the upstream data transfer device to the downstream data transfer device with a delay of a delay time calculated by the transfer-delay calculation unit 150. In addition, the ARQ-transmission instruction unit 130 is a processing unit that performs a request of retransmitting the packet received from the upstream data transfer device in response to an instruction from the ARQ-propriety determining unit 160 as described later.

The packet-loss detecting unit 140 is a processing part that detects packet loss from the head to the received packet of the FEC block. As an example, when the received packet is a new packet, the packet-loss detecting unit 140 makes a comparison between the sequence numbers in the FEC block obtained this time from the packet-information acquiring unit 100 and the sequence numbers in the FEC block obtained previously from the packet-information acquiring unit 100. At this moment, the presence of packet loss is found when the sequence numbers in the two FEC blocks are not sequentially numbered. In this case, the packet-loss detecting unit 140 adds the number of lost numbers between the sequence numbers in the FEC block obtained previously and the sequence number in the FEC block obtained this time to the number of lost packets which have been detected up to now. In addition, the packet-loss detection unit 140 subtracts one from the number of the lost packets which have been detected up to now because the lost packet is interpolated by retransferring when the received packet is a retransferred packet.

Thus, the packet-loss detection unit 140 performs renewal of the number of lost packets whenever a retransmitted packet arrives while carrying out the addition update of the number of lost packets whenever a packet loss is detected. Thus, the packet-loss detection unit 140 manages the newest number of lost packets whenever a packet is received. Here, the term "packet loss" indicates the loss of a packet as well as the loss of a data packet or FEC packet. In the above description, the case where the packet loss is detected from the sequence numbers in the FEC block has been described. Alternatively, the packet loss may be updated with arithmetic addition by a timer whenever the reception interval exceeds the transfer interval "$\tau+\alpha$".

The transfer-delay calculation unit 150 is a processing unit that calculates a transfer delay by which transmission of a received packet is delayed.

As an example, the transfer-delay calculation unit 150 calculates a transfer time of a received packet by adding a predetermined transfer delay, for example "$T-K\cdot\tau$", which has been calculated in advance, to the reception time of the received packet. Here, "$\tau$" represents a transfer interval of packets. Also, "K" represents the number of lost packets. Furthermore, "T" is a fixed value which is larger than a value obtained by multiplying the number M of packets which are restorable by the FEC packet with the transfer interval $\tau$ of packets (e.g., $M\cdot\tau$) and generally considers an exemplary case where "$M\cdot\tau+\alpha$". Here, "$\alpha$" represents a transmission delay time which is the time of delay caused by transmission. For example, "$\alpha$" is a positive value near zero.

More specifically, the transfer-delay calculation unit 150 subtracts "$K\cdot\tau$", which is a value obtained by multiplying the number K of lost packets detected by the packet-loss detection unit 140 by the transfer interval $\tau$, from the fixed value (=$M\cdot\tau$) to obtain a transfer delay "$M\cdot\tau-K\cdot\tau$". Then, the transfer-delay calculation unit 150 calculates the transfer time of the received packet by adding the transfer delay "$M\cdot\tau-K\cdot\tau$" to the reception time of the received packet.

The ARQ-propriety determining unit 160 is a processing unit that determines whether a retransmission request is performed on the upstream data transfer device based on a packet loss detected by the packet-loss detection unit 140 and a necessary retransmission time $\gamma$ which is required for retransmitting a packet.

That is, the ARQ-propriety determining unit 160 concludes that a retransmission request is required when the number K of lost packets is greater than a threshold obtained by subtracting a value, which is obtained by dividing the necessary retransmission time $\gamma$ by the transfer interval $\tau$ of the packet, from the number M of packets which are correctable by the FEC packet. In other words, the ARQ-propriety determining unit 160 makes the ARQ-transmission instruction unit 130 transmit a retransmission request when the determination expression "$M-\gamma/\tau<K$" is satisfied. The transfer interval $\tau$ may use an average value or a minimum value when the transfer interval varies.

The use of the above determination expression is based on the fact that there is a difficulty in appropriately determining which one among the packets in the FEC block is received to execute a retransmission request upon receiving the packet with reference to the number K of lost packets in the FEC block and the number M of packets correctable by the FEC packet. In other words, these two parameters help determine only the fact that a retransmission request may be required when the number K of lost packets is greater than the number M of packets correctable by the FEC packet.

Then, the ARQ-propriety determining unit 160 makes a transfer delay a minimum value $\tau$. In order to keep the transfer delay constant per FEC block, whether the retransmission request is performed or not is determined depending on whether the retransmitting packet arrives at a time which can be transferred within the specified transfer time $(N-1)\cdot\tau$ of the FEC block. Here, "N" represents the number of packets in one FEC block.

More specifically, upon receiving the packets at the final stage of transfer in the FEC block, a margin $\gamma/\tau$ is set up to substantially prevent the number of lost packets from becoming the number of packets uncorrectable within the transfer delay time when lost packets are restored by retransmitting. Then, the ARQ-propriety determining unit 160 makes the value "$M-\gamma/\tau$" a threshold value to be compared with the number K of lost packets, where the value "$M-\gamma/\tau$" is obtained by subtracting the margin $\gamma/\tau$ from the number M of packets error-correctable by the FEC packet. At this time, if the determination expression "$M-\gamma/\tau<K$" is satisfied, there is a possibility that the retransmitting packet arrives at a time which can be transferred within the specified transfer time even if "$M>K$". Thus, a retransmission request is executed by the ARQ-transmission instruction unit 130.

Here, the ARQ-propriety determining unit 160 does not perform a retransmission request for all the packets being lost in the FEC block even though the above determination expression "$M-\gamma/\tau<K$" is satisfied. This is because frequent generation of retransmission requests may lead to needless use of the upstream data transfer device and resources leading thereto. Therefore, when filling the above determination expression "$M-\gamma/\tau<K$", the ARQ-propriety determining unit 160 performs a retransmission request for more recent lost packets with the number thereof satisfying "$M-\gamma/\tau\geq K$" among packets lost in the FEC block. However, when the FEC packet is lost, priority is given to a FEC packet and a retransmission request is performed on the FEC packet.

Therefore, the maximum amount of FEC packets are used while a retransmission request is performed at the appropriate time. Therefore, the ARQ-transmission instruction unit 130 may effectively use resources while substantially preventing a variation in the transfer rate from occurring.

A case where the above determination expression is applied to a Pro-MPEG FEC is assumed by way of example. The Pro-MPEG FEC arranges packet data in a matrix and calculates an exclusive OR (X OR) in each row and column to generate an EEC packet as an error correction code. The dimensions of the matrix are defined within in the range of "$D*L\leq 100$, $1\leq L\leq 20$, and $4\leq D\leq 20$. Here, "L" represents a column and "D" represents a row.

Here, for example, a case with a transmission rate of 1 Mbps, a round trip time (RTT) of 50 msec, and a matrix size of 100 (=10×10) is assumed. If the matrix size is 10×10=100, the number of packets per block with a FEC is 120. In addition, the number of correctable packets per block is 19. If this one block is transferred, a transfer delay corresponds to only 19 packets (190 msec). Thus, one sixth of a delay per block is seen.

Therefore, as parameters related to the above determination equation, the number M of packets which are correctable by FEC packets is 19, the transfer interval of packets $\tau$ is 10 msec, the fixed value T is 190+$\alpha$ (msec), and the necessary retransmission time $\gamma$ (=RTT+$\beta$) is 50 msec. In this case, the above determination expression "$M-\gamma/\tau<K$" becomes "19−50/10<K", resulting in "14<K". Therefore, when the number of lost packets per block becomes greater than 14, packet transfer is feasible with a certain delay by performing correction with retransfer. Therefore, the above determination expression may be effectively performed at an actual rate. Furthermore, $\beta$ represents a necessary processing time used for retrieval of a retransmitted packet in the transfer device. For example, "$\beta$" is a positive value near zero.

The error correction unit 170 is a processing unit for correcting a packet loss detected by the packet-loss detection unit 140 in an FEC block using an FEC packet among packets included in the same FEC block.

More specifically, the error correction unit 170 determines whether the number of lost packets detected by the packet-loss detection unit 140 is greater than zero or not when the received packet is the last packet to be received as a packet of the same FEC block. The term "last packet" used herein indicates the last sequence number in the FEC block or a retransmitted packet received at a time over the received time (N−1) (τ+α) of the specified FEC block. Then, if the number of lost packets is greater than zero, the error correction unit 170 restores a packet loss with correction using the FEC packet.

[Flow of Process]

Next, the flow of a process performed in a data transfer device of the present embodiment will be described.

Figure 4:
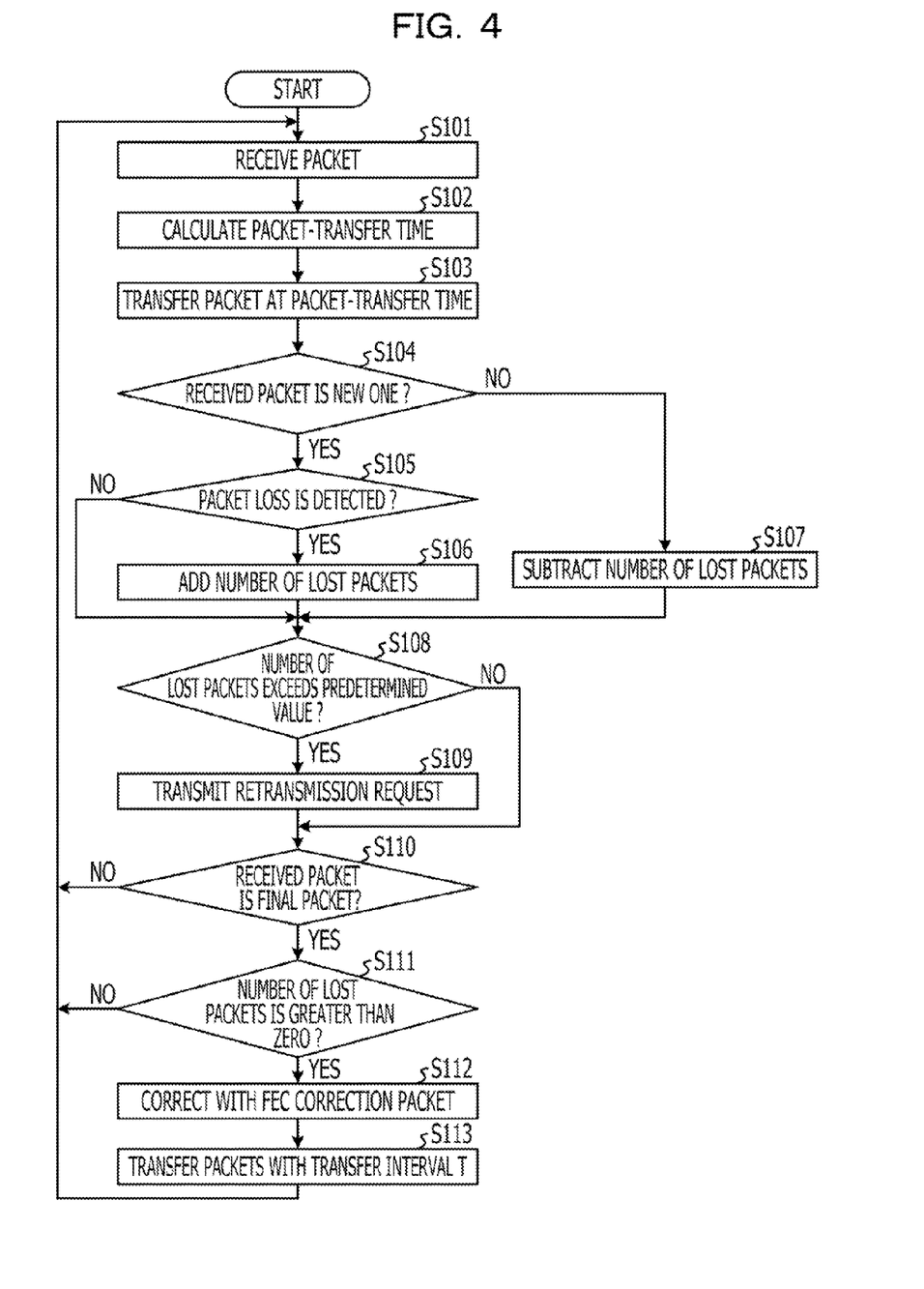
FIG. 4 is a flow chart illustrating the procedure of data transfer process according to the second embodiment.

FIG. 4 is a flow chart illustrating a procedure of a data transfer process according to a first embodiment. The data transfer process is performed recursively when the data transfer device 100 is being activated. The data transfer process is started upon receiving a packet from the upstream data transfer device.

As illustrated in FIG. 4, when the data transfer device 100 receives a packet from a data transfer device on the upstream side thereof (step S101), the transfer-delay calculation unit 150 calculates a specified transfer delay "T−K·τ" and then adds the calculated transfer delay to a received time to give the transfer time of the packet (step S102).

Subsequently, the packet-transfer instruction unit 120 causes the data transfer device 100 to transfer the packet received from the upstream data transfer device to the downstream data transfer device at the transfer time calculated by the transfer-delay calculation unit 150 (step S103). Here, the order of a sequence of transmitting packets to be transferred at this time among packets in the FEC block is written as sequence numbers in the FEC block on the FEC header.

Then, the packet-loss detection unit 140 determines whether the received packet is a new packet or not (step S104). At this time, if the received packet is a new packet (Yes in step S104), the packet-loss detection unit 140 detects a packet loss (step S105). Then, if the packet loss is detected (Yes in step S105), the packet-loss detection unit 140 adds the number of lost packets currently detected to the number of lost packets which have been detected up to now (step S106).

On the other hand, if the received packet is a retransmitted packet (No in step S104), the packet-loss detection unit 140 subtracts one from the number of the lost packets which have been detected up to now because the lost packet is interpolated by retransmission (step S107).

Then, the ARQ-propriety determining unit 160 determines whether the number K of lost packets exceeds a predetermined value, for example whether the above determination expression "M−γ/τ<K" is satisfied (step S108). At this time, if the number K of lost packets exceeds the predetermined value (Yes in step S108), the ARQ-transmission instruction unit 130 transmits a retransmission request to the upstream data transfer device via a communication interface not shown in the figure (step S109). Furthermore, no retransmission request is performed when the number of lost packets is not more than the predetermined value (No in step S108). Thus, the process proceeds directly to step S110.

Furthermore, if the received packet is the final packet (Yes in step S110), the error correction unit 170 determines whether the number of lost packets, which is detected by the packet-loss detection unit 140, is greater than zero (step S111).

As a result, if the number of lost packets is greater than zero (Yes in step S111), the error correction unit 170 restores the packet loss with correction using the FEC packet (step S112).

Subsequently, the packet-transfer instruction unit 120 transfers a packet restored by the error correction unit 170 to the downstream data transfer device with a transfer interval τ from the previous packet transfer (step S113). Then, the process returns to the step S101.

If the received packet is the final packet or the number of lost packets is zero (No in step S110 or No in step S111), the process returns to step S101.

[Effects of Second Embodiment]

As described above, the data transfer device 100 of the present embodiment brings forward a retransmission request which takes into account not only the number K of packets which are error-correctable by the FEC packets, but also a necessary retransmission time γ required for retransmitting a packet. Therefore, the data transfer device 100 of the present embodiment is capable of reducing the possibility of requiring the retransmitting of a packet when receiving the last stage packets of the FEC block. Thus, even if a packet loss has already occurred when the final stage packets of the FEC block are transferred, the data transfer device 100 of the present invention may become increasingly likely to restore the packet loss by itself using the error correction packet. Thus, the data transfer device 100 of the present embodiment may be prevented from causing a variation in transfer rate.

Figure 5:
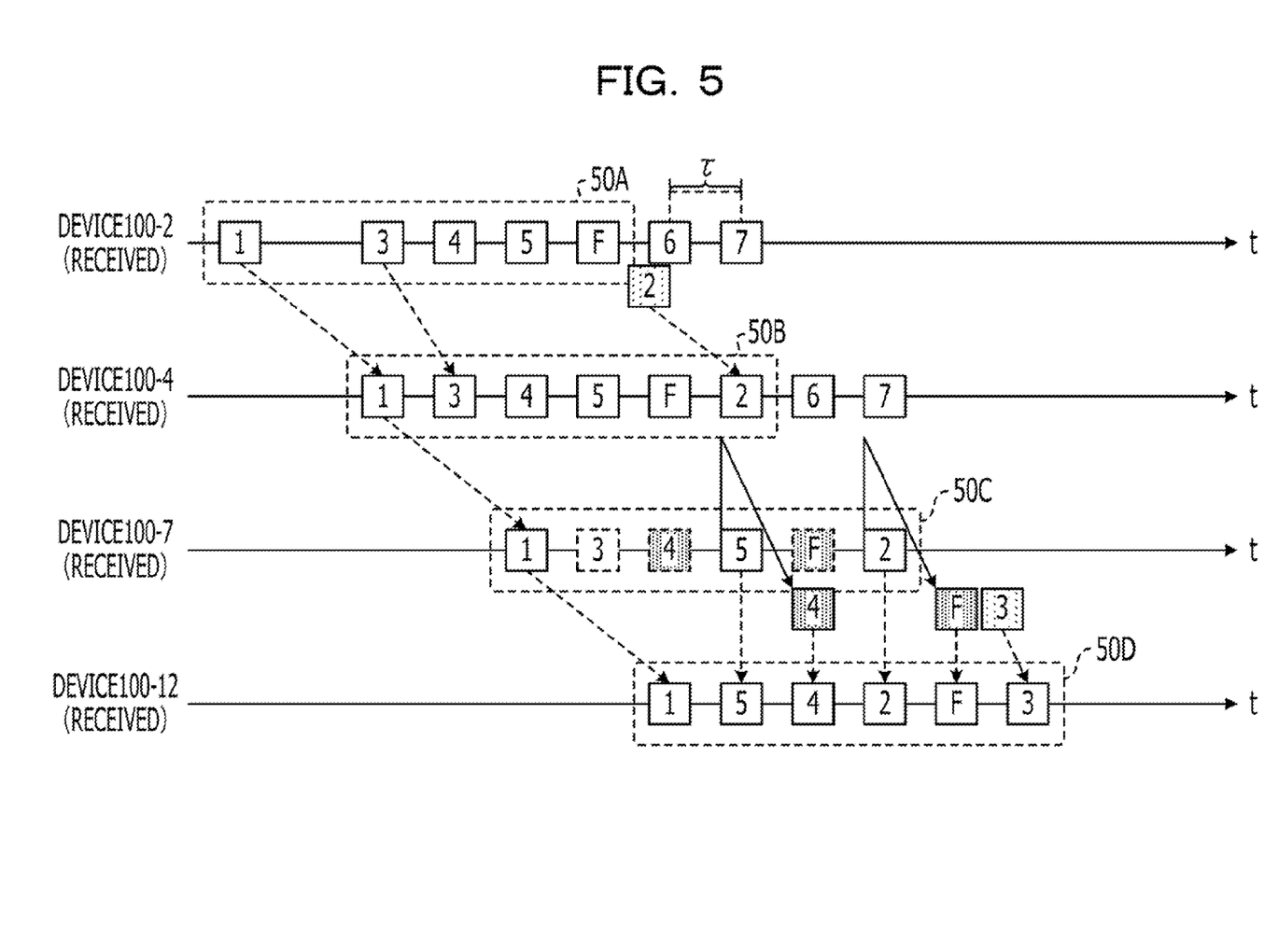
FIG. 5 is a diagram illustrating exemplary data transfer of the data transfer apparatus according to the second embodiment.

Here, the effects of the second embodiment will be described while referring to exemplary data transfer with reference to FIG. 5. FIG. 5 is a diagram illustrating exemplary data transfer of the data transfer apparatus according to the second embodiment. The example illustrated in FIG. 5 considers that the number of packets is six in one FEC block and data transfer is sequentially performed on devices 100-2, 100-4, 100-7, and 100-12 in this order. Reference numerals 1 to 7 in FIG. 5 represent data packets where data to be transferred is allocated.

In addition, reference numerals 50A to 50D in FIG. 5 represent blocks each including six packets including five packets (data packets 1 to 5) and a FEC packet F. In the example illustrated in FIG. 5, the transfer interval of packets is defined as τ and the transfer delay of packets is defined as "T−K·τ", and the number of packets M, which is restorable by FEC packet F is set to "2". Then, data transfer is considered to be performed under the condition of: "T=M·τ+α" with a necessary retransmission time of γ=τ.

In the example illustrated in FIG. 5, it is found that the device 100-7 of the second embodiment is substantially prevented from causing a variation in transfer rate, which is caused in the transfer performed by the device C of the related art illustrated in FIG. 8. In other words, the data transfer device 100-7 receives the data packet 1. In this case, the number of lost packets becomes zero (K=0). Therefore, the data transfer device 100-7 transmits the data packet 1 to the data transfer device 100-12, after implementing a delay of only "2τ+α (=2·τ+α−0·τ)". Subsequently, the device 100-7 skips data packets 3 and 4 and then receives data packet 5. In this case, the data packets 3 and 4 are lost and the number of lost packets is two (K=2). Thus, the data transfer device 100-7 transmits the data packet 5 to the downstream data transfer device 100-12 with a delay of "α (=2·τ+α−2·τ)".

Here, in the data transfer device 100-7, if the above determination expression "M−γ/τ<K" is applied, the expression becomes "M−γ/τ=1<K=2", satisfying the determination equation. The data transfer device 100-4 requests the upstream data transfer device 100-4 to retransmit the data packet. Then, the data transfer device 100-7 receives the data packet 4 retransmitted from the upstream transfer device 100-4 and then transmits the data packet 4 to the data transfer device 100-12 on the downstream side after implementing a delay of only "α (=2·τ+α−2·τ)". Then, the data transfer device 100-7 reduces the number K of lost packets from 2 to 1.

Subsequently, the data transfer device 100-7 skips the FEC packet and then receives the data packet 2. In this case, the data packets 3 and the FEC packet are lost and the number of lost packets is two (K=2). Thus, the data transfer device 100-7 transmits the data packet 2 to the downstream data transfer device 100-12 with a delay of "α (=2·τ+α−2·τ).

After that, in the data transfer device 100-7, the above determination expression becomes "M−γ/τ=1<K=2", satisfying the determination equation. The data transfer device 100-7 requests the upstream data transfer device 100-4 to retransmit the FEC packet. Then, the data transfer device 100-7 receives the FEC packet retransmitted from the upstream transfer device 100-4 and then transmits the data packet 4 to the data transfer device 100-12 on the downstream side after implementing a delay of only "α (=2·τ+α−2·τ)". Then, data transfer device 100-7 reduces the number K of lost packets from 2 to 1.

Upon receiving the FEC packet F as a final packet, the data transfer device 100-7 restores an uncorrected data packet 3 in a loss state and then transmits the restored packets to the data transfer device 100-12 on the downstream side with a transfer interval of τ.

In this way, the data transfer device 100-7 of the present embodiment is capable of performing a retransmission request at the stage of receiving the data packet 5 using the above determination equation. Therefore, it is within the error correction capability of the FEC packet at the stage of receiving the final data packet 2 among the packets included in the FEC block. Therefore, the data transfer device 100-7 of the present invention is capable of performing data transfer while retaining a transfer delay of "T−K·τ".

Furthermore, the data transfer device 100 of the present invention transmits a retransmission request to the packet-transmission source device when the number K of lost packets is greater than a threshold obtained by subtracting a value, which is obtained by dividing the necessary retransmission time γ by the transfer interval τ of the packet, from the number M of packets which can be corrected by the FEC packet. Therefore, upon receiving the packets at the final stage of transfer among the packets in the FEC block, a retransmission control may be performed to substantially prevent the number of lost packets from becoming the number of packets uncorrectable within the transfer delay time of the FEC block when lost packets are restored by retransmission. Therefore, the data transfer device 100 of the present embodiment may be more effectively prevented from causing a variation in transfer rate.

Furthermore, the data transfer device 100 of the present embodiment corrects a packet loss detected in the same FEC block using the FEC packet. Furthermore, the data transfer device 100 of the present embodiment continues to transfer the corrected packets after the finally received packet among packets in the same FEC block. Therefore, in the data transfer device 100 of the present embodiment, the maximum amount of FEC packets are used while a retransmission request is performed at the appropriate time. Thus, the data transfer device 100 of the present embodiment may effectively use resources while preventing a variation in transfer rate from occurring.

[Third Embodiment]

Although the embodiments of the device disclosed in the present application have been described. In addition to the configurations of the aforementioned embodiments, various different configurations may be applied to the embodiments disclosed in the present application. Hereinafter, other embodiments of the present invention will be described.

[Applicable Scope]

In the above second embodiment, the description has been made for transfer of data, such as video data and audio data, for example. Alternatively, the data may be other kinds of data, such as documents and applications that do not always require a real time nature, for example.

[Others]

Furthermore, each of the structural components of the respective devices shown in the drawings may not be necessarily constructed in the physical form as illustrated in the drawings. That is, the concrete forms of distribution and integration of each device are not restricted to the forms illustrated in the drawings. All or part of the device may be configured by functional or physical distribution and integration in arbitrary units depending on various kinds of loads, usage circumstances, and so on. Furthermore, the packet-information acquiring unit 110, packet-transfer instruction unit 120, ARQ-transmission instruction unit 130, packet-loss detection unit 140, transfer-delay calculation unit 150, ARQ-propriety determining unit 160, and/or error correction unit 170 may be provided as external devices of the data transfer device.

Then, the external devices may be connected via a network. Furthermore, the packet-information acquiring unit 110, packet-transfer instruction unit 120, ARQ-transmission instruction unit 130, packet-loss detection unit 140, transfer-delay calculation unit 150, ARQ-propriety determining unit 160, and error correction unit 170 may be included in other devices. Then, the other devices may be connected via a network to coordinate with one another to realize the functions of the above data transfer device.

[Data Transfer Program]

Various kinds of processing described in the above embodiments may be realized by running prepared programs on a computer, such as a personal computer or a workstation. In the following description, an exemplary computer on which a data transfer program is executed, which has the similar functions as those of the above embodiments, will be described with reference to FIG. 6. Here, FIG. 6 is a diagram illustrating an exemplary computer executing a data transfer program according to a third embodiment.

Figure 6:
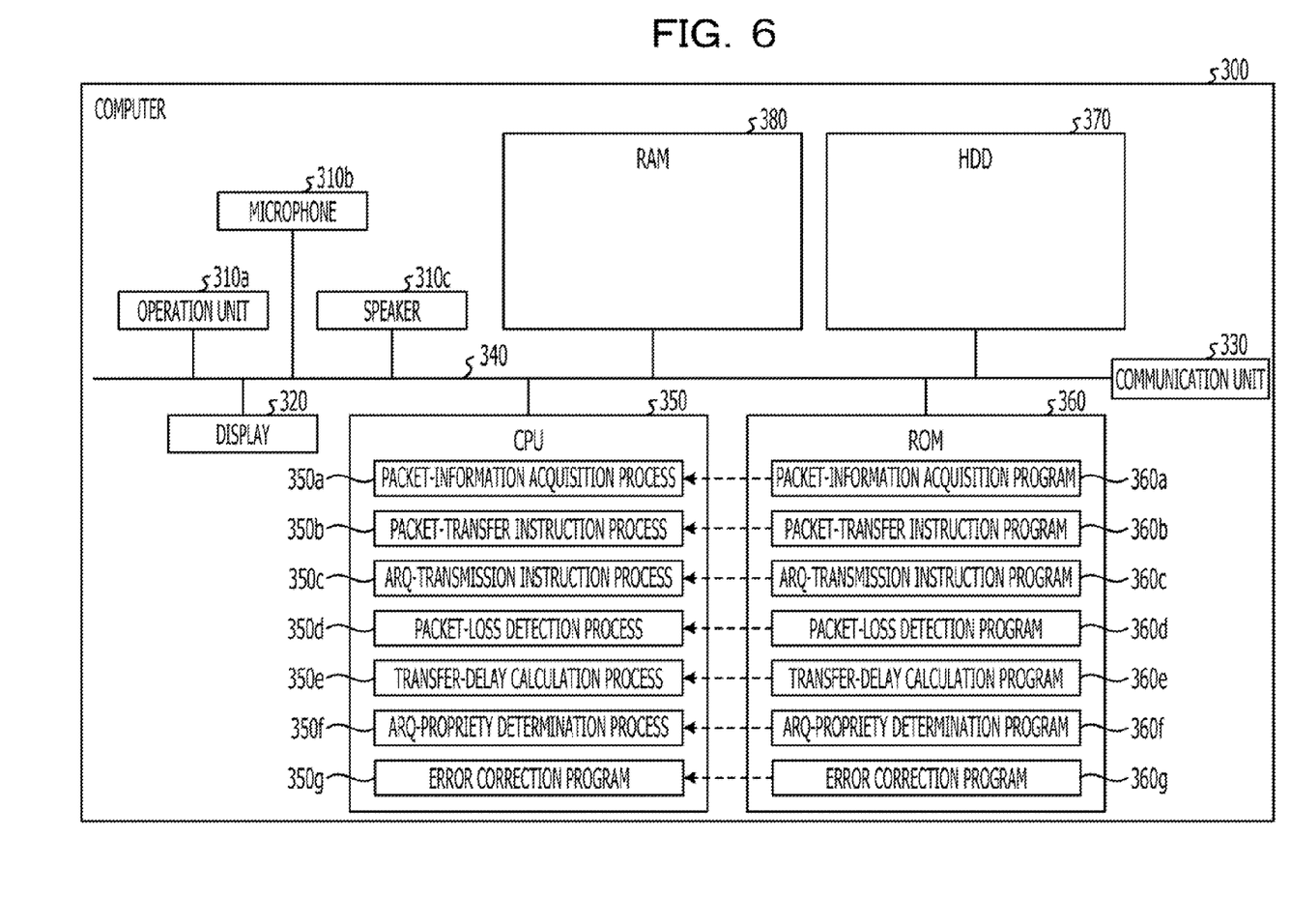
FIG. 6 is a diagram illustrating an exemplary computer executing a data transfer program according to a third embodiment.

As illustrated in FIG. 6, a computer 300 according to the third embodiment includes an operation unit 310a, a microphone 310b, a speaker 310c, a display 320, and a communication unit 330. In addition, the computer 300 includes a CPU 350, a ROM 360, a hard disk drive (HDD) 370, and random access memory (RAM) 380. The components 310 to 380 are connected together via a bus 340.

The ROM 360 previously stores control programs that exert substantially the same functions as those of the packet-information acquiring unit 110, the packet-transfer instruction unit 120, and the ARQ-transmission instruction unit 130, which have been described in the above second embodiment. Furthermore, the ROM 360 previously stores control programs that exert substantially the same functions as those of the packet-loss detection unit 140, the transfer-delay calculation unit 150, the ARQ-propriety determining unit 160, and the error correction unit 170. In other words, as illustrated in FIG. 6, the ROM 360 stores a packet-information acquisition program 360a, a packet-transfer instruction program 360b, and an ARQ-transmission instruction program 360c. Furthermore, the ROM 360 stores a packet-loss detection program 360d, a transfer-delay calculation program 360e, an ARQ-propriety decision program 360f, and an error-correction program 360g. These programs 360a to 360g may be suitably unified or separated in a manner similar to the respective components of the data transfer device as illustrated in FIG. 3. Furthermore, each piece of data stored in the RAM 360 may not be entirely stored all the time. Only the data required for processing may be stored in the RAM 360.

Then, the CPU 350 reads and executes the programs 360a to 360g from the ROM 360. Therefore, as illustrated in FIG. 6, the CPU 350 may function as a packet-information acquisition process 350a, a packet-transfer instruction process 350b, and an ARQ-transmission instruction process 350c for the respective programs 360a to 360g. Furthermore, the CPU 350 includes a packet-loss detection process 350d, a transfer-delay calculation process 350e, an ARQ-propriety determination process 350f, and an error-correction process 350g. The CPU 350 executes a data-transfer program while using the storage area of the RAM 380. The processes 350a to 350g correspond to the respective functional units illustrated to FIG. 3. Each processing unit, which is virtually realized on the CPU 350, may not always be executed on the CPU 350. Only a processing unit required for processing may be virtually realized.

Furthermore, the above data-transfer program may not always be stored in the HDD 370 or ROM 360 from the beginning. For example, each program may be stored in a "portable physical medium", such as a flexible disk, or a so-called a floppy disk (FD), a CD-ROM disk, a DVD disk, a magnetic optical disk, or an IC card, to be inserted into the computer 300, for example. Then, the computer 300 may acquire and execute each program stored in the portable physical media. Alternatively, each program may be stored in another computer or a server device connected to the computer 300 via a public line, the Internet, LAN, WAN, or the like. The computer 300 may acquire and execute each program from any of the above devices.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A data transfer device, comprising:
    a processor; and
    a memory which stores a plurality of instructions, which when executed by the processor, cause the processor to execute,
        receiving packets in a block including a data packet and an error-correction packet;
        detecting a packet loss from a head of a block received by the receiving of a received packet;
        transferring the packet received from the receiving with a delay of a predetermined time; and
        transmitting a retransmission request based on the detecting and a determined retransmission time to retransmit the packet, wherein
        when the packet loss detected by the detecting is greater than a threshold value obtained by subtracting a value obtained by dividing the determined retransmission time by an interval of transferring packets, from a number of packets that are error-correctable by an error correction packet, a retransmission request is transmitted to a packet-transmission source device.

2. The data transfer device according to claim 1, the processor further caused to execute:
    correcting the packet loss detected in the head of the block by the detecting using an error correction packet received as a packet for error correction from the receiving, wherein
    the packet corrected by the correcting is transferred when a last packet of the block is received.

3. A data transfer method to be used in a data transfer system where a packet transmitted from a first device is received by a second device and the packet received by the second device is transferred to a third device, the method comprising:
    receiving packets in a block including a data packet and an error-correction packet by the second device;
    detecting a packet loss from a head of a block received in the receiving of a received packet;
    transferring, to the third device, the packet received in the receiving with a delay of a predetermined time; and
    transmitting a retransmission request to the first device based on the packet loss detected in the detecting and a determined retransmission time to retransmit the packet, wherein
    when the packet loss detected by the detecting is greater than a threshold value obtained by subtracting a value obtained by dividing the determined retransmission time by an interval of transferring packets, from a number of packets that are error-correctable by an error correction packet, a retransmission request is transmitted to the packet-transmission source device.

4. A computer-readable non-transitory storage medium including a program to cause a data transfer device to execute operations, the program comprising:
    receiving packets in a block including a data packet and an error-correction packet;
    detecting a packet loss from a head of a block received in the receiving of a received packet;
    transferring the received packet with a delay of a predetermined time; and
    transmitting a retransmission request to a device from which the packet has been transmitted, based on the packet loss detected in the detecting and a determined retransmission time to retransmit the packet, wherein
    when the packet loss detected by the detecting is greater than a threshold value obtained by subtracting a value obtained by dividing the determined retransmission time by an interval of transferring packets, from a number of packets that are error-correctable by an error correction packet, a retransmission request is transmitted to the packet-transmission source device.

* * * * *